UNITED STATES PATENT OFFICE.

JAMES O'FRIEL, OF BROOKLYN, NEW YORK.

IMPROVEMENT IN THE MANUFACTURE OF ARTIFICIAL STONE.

Specification forming part of Letters Patent No. 119,394, dated September 26, 1871.

*To all whom it may concern:*

Be it known that I, JAMES O'FRIEL, of Brooklyn, in the county of Kings and State of New York, have invented an Improved Composition for Artificial Stone; and the following is declared to be a correct description thereof.

The compounds in which tar forms a part are liable to soften in warm weather, and mixtures of lime and sand with stone, or ordinary hydraulic cement, do not resist the action of frost, especially when employed for walks or pavements. My composition is made for use under circumstances of greater or less exposure to atmospheric influences, frost, dampness, and water. I have discovered that a mixture of cement, such as that known as the Portland cement, or other with equivalent properties, when mixed with silicate of soda or liquid glass and black oxide of manganese, will form a cement that will harden and be very tough, strong, and water-proof, and at the same time there will not be disintegration or deliquescence. I make use of Portland cement and black oxide of manganese in the proportion of about two thousand parts of the former to one hundred and sixteen parts of the latter; these are to be mixed with about five thousand parts of silex or clay. These are to be mixed intimately in a dry state, and then mixed into a plastic state by the addition of silicate of soda or water-glass. This composition may also contain about one hundred parts of oxide of silicum mixed with the same. Other material having the same ingredients as Portland cement may take the place of the said cement in the said compound. Where it is desired to cause this compound to harden with greater rapidity a solution of chloride of calcium or chloride of iron may be spread upon the surface of the cement after it has been laid to its place.

When this composition cement is to be applied to roadways, sidewalks, or floors, broken stones or chips are to be added in any desired proportion so long as the said plastic cement is sufficient to fill the interstices and form a perfect bond for said chips or broken stones.

This composition may be used as a cement for building purposes or for any desired object.

I claim as my invention—

The composition herein specified for a cement, prepared substantially as set forth.

Signed by me this 4th day of August, A. D. 1871.

JAMES O'FRIEL.

Witnesses:
HAROLD SERRELL,
GEO. T. PINCKNEY. (106)